(12) United States Patent
Kaiser (10) Patent No.: US 11,247,588 B2
(45) Date of Patent: Feb. 15, 2022

(54) NEWBORN INSERT FOR A CHILD SAFETY SEAT

(71) Applicant: BRITAX RÖMER KINDERSICHERHEIT GmbH, Leipheim (DE)

(72) Inventor: Thomas Kaiser, Laupheim (DE)

(73) Assignee: BRITAX RÖMER KINDERSICHERHEIT GmbH, Leipheim (DE)

(*) Notice: Subject to any disclaimer, the term of this patent is extended or adjusted under 35 U.S.C. 154(b) by 0 days.

(21) Appl. No.: 16/012,944

(22) Filed: Jun. 20, 2018

(65) Prior Publication Data

US 2019/0084450 A1    Mar. 21, 2019

(30) Foreign Application Priority Data

Jun. 20, 2017  (DE) .................. 202017003248.1

(51) Int. Cl.
| | | |
|---|---|---|
| *B60N 2/28* | (2006.01) | |
| *A47D 15/00* | (2006.01) | |
| *A47D 13/02* | (2006.01) | |
| *B60N 2/26* | (2006.01) | |

(52) U.S. Cl.
CPC ......... *B60N 2/2881* (2013.01); *A47D 13/025* (2013.01); *A47D 15/006* (2013.01); *B60N 2/2851* (2013.01); *B60N 2/2872* (2013.01); *B60N 2/2884* (2013.01); *B60N 2/265* (2013.01); *B60N 2/2803* (2013.01); *B60N 2002/2815* (2013.01); *B60N 2002/2818* (2013.01)

(58) Field of Classification Search
CPC .. B60N 2/2881; B60N 2/2851; B60N 2/2872; B60N 2/2884; B60N 2/2803; B60N 2/265; B60N 2002/2815; B60N 2002/2818; A47D 13/025; A47D 15/006
USPC .......................................... 297/219.12; 5/655
See application file for complete search history.

(56) References Cited

U.S. PATENT DOCUMENTS

| | | | | | |
|---|---|---|---|---|---|
| 4,775,183 | A | * | 10/1988 | Tsuge ...................... | B60N 2/28 297/219.12 |
| 5,586,351 | A | * | 12/1996 | Ive .......................... | B60N 2/26 5/655 |
| 5,988,744 | A | * | 11/1999 | Franchak .............. | A47D 15/006 297/219.12 |
| 7,547,065 | B2 | * | 6/2009 | Barger ................. | B60N 2/2812 297/250.1 |
| 7,748,780 | B2 | * | 7/2010 | Sizemore ................ | B60N 2/60 297/219.12 |

(Continued)

FOREIGN PATENT DOCUMENTS

EP    2962893 A1    1/2016

OTHER PUBLICATIONS

Search Report from priority German application No. 202017003248.1 dated Dec. 6, 2017, all enclosed pages cited.

*Primary Examiner* — Syed A Islam
(74) *Attorney, Agent, or Firm* — K&L Gates LLP (57) ABSTRACT

A newborn insert for a child safety seat may include an accommodation region for a child, and an energy-transferring element. The energy-transferring element may include an inherently stable component, and may be arranged laterally at the accommodation region such that the energy-transferring element is positioned at the child's shoulder height when the child is placed in the accommodation region.

18 Claims, 4 Drawing Sheets

(56) References Cited

U.S. PATENT DOCUMENTS

| | | | |
|---|---|---|---|
| 9,579,996 B2 | 2/2017 | Gaudreau, Jr. et al. | |
| 2008/0277981 A1 | 11/2008 | Sizemore | |
| 2010/0078976 A1* | 4/2010 | Hou .................... | B60N 2/2845 |
| | | | 297/230.13 |
| 2015/0375641 A1* | 12/2015 | van Mourik ......... | B60N 2/2881 |
| | | | 297/250.1 |

* cited by examiner

NEWBORN INSERT FOR A CHILD SAFETY SEAT

The subject matter of the invention is a newborn insert for a child safety seat. The invention relates in particular to a newborn insert for a child safety seat which comprises an energy-transferring element with a component of inherently stable material so as to transfer the energy in the case of a side impact via the child's shoulder region to the child's body, and so as to thus better protect the child's head during a side impact.

Due to their shortness, it is not possible for children to be secured in vehicles by means of the vehicle's safety belts. For this reason, child safety seats have to be used for the secure transport of children in vehicles. Such child safety seats are usually fastened on one of the vehicle's seats. They are either fixed by a safety belt of the vehicle or are anchored on the vehicle seat by a special fastening mechanism, such as, for instance, an Isofix fastening.

While in both cases the child safety seat is, in the case of a head-on collision, i.e. a strong acceleration or deceleration of the vehicle in the direction of movement, as a rule, safely decelerated without hitting an obstacle in the vehicle interior, the child safety seat is much less safeguarded in the case of a side impact. Since the child safety seat is usually installed on one of the side seats of the vehicle, it has regularly a small lateral distance to the inner side of the vehicle. This distance is normally not sufficient to decelerate the relative movement of the child safety seat prior to an impact of the child safety seat on the vehicle's inner side with the aid of the seat fastening means. In the case of a side impact the risk therefore exists that the child safety seat hits on the vehicle's inner side with substantial speed. In the case of this side impact the lateral movement of the child safety seat is stopped within very short time, which corresponds to a strong deceleration. This deceleration in turn induces substantial force for the child positioned in the child safety seat, by which the child may be injured heavily.

Specifically newborns and infants are endangered by the force effect in the case of head-on and side collisions. It is therefore provided by rights for the protection of newborns and infants that they have to be transported in backward retaining systems, such as, for instance, baby car seats. In such retaining systems the children assume a lying position and are secured by means of a belt system integrated in the retaining system. Child safety seats may be fixed on the vehicle seat with the safety belt of the vehicle or with other fastening systems, such as an Isofix system.

In order to be admitted for the use in vehicles, child safety seats have to undergo a test procedure. Presently, approvals are granted pursuant to two different regulations: ECE Regulation No. 44 according to which child safety seats are classified in weight classes, and ECE Regulation No. 129 which orientates itself, apart from the child's weight, especially at the child's size ("i-size").

In contrast to the ECE Regulation No. 44, child safety seats certified pursuant to the Regulation No. 129 may only be used in backward direction in the first 15 months of the child's life. A reason for this is i.a. that tests have shown that backward driving is much safer for infants. Moreover, pursuant to the Regulation No. 129 a load test of the child safety seat by a side impact is also performed. In order to fulfill the prerequisites of the Regulation No. 129, additional requirements are placed to the child safety seats, especially to backward retaining systems such as, for instance, baby car seats, as compared to the Regulation No. 44.

In the case of backward child safety seats such as, for instance, baby car seats, it is especially the head of the child that is to be protected efficiently in the case of a side impact. During a side impact it is possible that the child safety seat is pushed from outside, as described above. In this case the child moves, due to his or her inertia, toward the side wall of the child safety seat. The forces and moments acting during the impact are transferred via the child safety seat to the child. In known child safety seats the impact of the child relative to the seat takes place relative to soft, planar damping materials. Since children of different size are transported in the child safety seat, the inner contour of the child safety seat is not adaptable individually to the requirements of the respective child. For adapting the height of the exit points of the shoulder belts integrated in the child safety seat it is possible to adjust them in known child safety seats. Due to the different position of the shoulder and of the head as a function of the body height, however, known child safety seats and especially known baby car seats do not offer an optimum solution. This is because the damping elements integrated in the child safety seat are not adapted to the individual posture and position of the child's shoulder and head. Inserts for newborns which help adjust the posture and position of a child in the child safety seat, especially in the baby car seat, are indeed known, but the known newborn inserts serve mainly the purpose of comfort and have at best an influence on the height of the child's hip position. Despite the use of the known newborn inserts it cannot be guaranteed for different body heights that the damping elements integrated in the child safety seat guide the impact energy largely past the child's head.

It is therefore an object of the present invention to provide a newborn insert for a child safety seat which optimizes the protection of a child transported in a child safety seat in the case of a side impact independently of the child's age and body height. This object is solved by the newborn insert for a child safety seat in accordance with the invention according to claim 1. Advantageous further developments of the present invention are represented in subclaims 2 to 11. A baby car seat according to claim 12 which comprises a newborn insert in accordance with the invention solves an appropriate object.

The newborn insert for a child safety seat in accordance with the invention comprises an accommodation region for a child and an energy-transferring element comprising an inherently stable component, wherein the energy-transferring element is arranged laterally at the accommodation region such that it is positioned at the child's shoulder height when the child is placed in the accommodation region. By the fact that the newborn insert comprises an energy-transferring element the newborn insert fulfils a protective function for the child. Moreover, due to the fact that the energy-transferring element is arranged at the accommodation region at the child's shoulder height, protection is granted for the adolescent child since the newborn insert and hence the energy-transferring element can be positioned in the child safety seat in an age-appropriate manner. Hence, the energy-transferring element is positioned optimally for the child's protection, irrespective of the child's size or age. The arrangement in accordance with the invention of the energy-transferring element ensures that a large part of the energy acting on the child in the case of an impact, especially a side impact, is transferred via the shoulder region to the child's body. The head does not get into contact with the side wall of the child safety seat. The fact that the energy-transferring element comprises an inherently stable component, i.e. a component of inherently stable material, ensures that the shoulder is pushed in a controlled manner in the direction of movement of the child safety seat in the case of a side impact. Thus, a part of the energy of the impact is transformed into kinetic energy of the body, on the one hand, and the head of the child is kept at a distance from the side wall of the child safety seat, on the other hand.

The inherently stable component consists preferably of expanded polystyrene, EPS. EPS is a coarse-pored rigid foam. It is especially suited as an inherently stable material. EPS has the required stability for transferring the energy of the impact to the child's shoulder region in the case of a side impact. It is of advantage if the component has a thickness between 15 mm and 30 mm, particularly preferred between 20 mm and 25 mm. In the case of the thicknesses mentioned the child still has sufficient space and comfort in the shoulder region in a baby car seat under normal conditions of use.

It is expedient if the energy-transferring element is designed such that it transfers a force acting laterally on the energy-transferring element to the child's shoulder region and displaces it relative to the newborn insert. Due to the fact that a laterally acting force—for instance, in the case of a side impact—is transferred to the child's shoulder region and hence the shoulder region is displaced, the forces of the impact, especially the forces of the side impact, are transferred via the shoulder region to the body. This is advantageous for anatomic reasons since the shoulder region is particularly stable due to the bones and is therefore particularly suited as a "supporting apparatus". Due to the distinctly larger mass of the remaining body as compared to the head, the shoulder region absorbs a large part of the energy of the impact without the child suffering damage. The acceleration of the body relative to the child safety seat or the newborn insert is small. A large part of the impact energy is therefore kept off the child's head.

In a particularly preferred manner the accommodation region comprises a deformable head region for accommodating the child's head and a trunk region for accommodating the child's body, wherein the energy-transferring element is arranged laterally at the trunk region. The division of the accommodation region into a head region and a trunk region enables easier positioning of the newborn insert in the child safety seat. Moreover, this division also facilitates a simpler and intuitive positioning of the child on the newborn insert. The child's head is positioned in the head region. The rest of the body, especially the trunk, is positioned on the trunk region. The arrangement of the energy-transferring element laterally at the trunk region ensures that, in the case of a side impact, a part of the impact energy is transferred to the shoulder region. For this purpose it is of advantage if the energy-transferring element is arranged in the half of the trunk region which faces the head region. The deformable design of the head region has the advantage that the child's head is supported comfortably under normal conditions of use. Moreover, the deformable head region dampens the impact in the head region in the case of a side impact.

In accordance with the invention the newborn insert may be of one-part or multi-part, preferably two-part, design. Preferably, the head region and the trunk region are fixedly or separably connected to one another. Expediently, the head region and the trunk region are fixedly connected with one another if the newborn insert has a one-part design. Expediently, the head region and the trunk region are separably connected to one another if the newborn insert has a multi-part design. A multi-part design of the newborn insert facilitates manufacturing. Moreover, it is possible to store the newborn insert in a more compact manner when not in use.

Preferably, the head region and the trunk region are coupled with one another such that a belt of the child safety seat can be passed between the head region and the trunk region. It is particularly preferred if a clearance or a slot is formed between the head region and the trunk region which serves as a positioning aid for the belt. Expediently, the clearance or the slot serves as a positioning aid for a shoulder belt of the child safety seat. This ensures that the belt system integrated in the child safety seat can also be used correctly when the newborn insert in accordance with the invention is used. Moreover, the clearance or slot facilitates the correct positioning of the newborn insert in a child safety seat. This is because due to the fact that the shoulder belt is expediently guided through the clearance or slot, the head region and the trunk region are adjusted such that the newborn insert is supported in the child safety seat, for instance, the baby car seat, in accordance with the child's age. Specifically, this also ensures that the energy-transferring element is positioned correctly. Due to the guiding of the (shoulder) belt through the clearance or slot of the newborn insert, an adjustment of the (shoulder) belt causes an adjustment of the newborn insert and hence of the energy-transferring element.

It is preferred if the head region and/or the trunk region each comprise an insert of polyurethane foam. Preferably, the polyurethane foam comprises composite flock foam, particularly preferred composite flock foam with a density of 100 g/l. Polyurethane foam, especially composite flock foam, has dampening and resilient properties. The insert in the trunk region increases especially the child's comfort. It is of advantage if the insert in the trunk region has a thickness between 5 mm and 20 mm, preferably between 10 mm and 15 mm, particularly preferred 10 mm. The insert in the head region offers the child additional protection in the case of a head-on collision or in the case of a rear-end collision. The insert dampens and cushions the strongly accelerated head in the cases mentioned. Especially in the case of a rear-end collision an additional dampening by the insert is of advantage. The child safety seat positioned against the direction of travel, especially the baby car seat positioned against the direction of travel, is, in the case of a rear-end collision, first of all accelerated more strongly than the child and especially the child's head. Subsequently, the child's head bounces back into the head region of the newborn insert. This bouncing-back of the head is cushioned by the insert of polyurethane foam, preferably of composite flock foam. For this purpose it is of advantage if the insert in the head region has a thickness between 10 mm and 40 mm, preferably between 20 mm and 30 mm, particularly preferred 20 mm. It is further expedient that the thickness of the insert in the head region is maximally twice as large as the thickness in the trunk region. Such choice prevents that the transition between the head region and the trunk region comprises too large a step which makes lying of the child uncomfortable. Instead of an insert with the thickness mentioned it is also possible to stack a plurality of inserts such that the desired thickness is achieved.

It is of further advantage if the head region is of three-part design. Preferably, a middle segment comprises the insert of polyurethane foam. The middle segment serves as a rest for the head of the child under normal conditions of use. The two lateral segments are preferably padded. The lateral segments protect the child's head from the influence of lateral forces. Moreover, they increase the child's comfort.

Preferably, the energy-transferring element is designed as a pocket which includes the inherently stable component. It is particularly preferred if the inherently stable component is removably integrated in the newborn insert. This has the advantage that, in the case of a required cleaning, the inherently stable component may be removed from the newborn insert, especially the pocket. This enables machine washing without subjecting the inherently stable component to the risk of damage or destruction.

It is expedient if the newborn insert further comprises a second energy-transferring element with a corresponding inherently stable component, wherein the second energy-transferring element is arranged laterally at the accommodation region such that it is positioned at the child's shoulder height when placed in the accommodation region. This arrangement of two energy-transferring elements, namely one at each side of the newborn insert, has the advantage of a comprehensive protection of the child irrespective of the direction of the side impact. The second energy-transferring element is preferably designed like the first one. All the embodiments described before for the first energy-transferring element are also applicable for the second energy-transferring element.

A further aspect of the invention relates to a baby car seat comprising a newborn insert in accordance with the invention. The advantages of the baby car seat result from the afore-described advantages of the newborn insert in accordance with the invention.

In the following, preferred embodiments of the present invention will be described by means of the following Figures. There show.

Figure 1A:
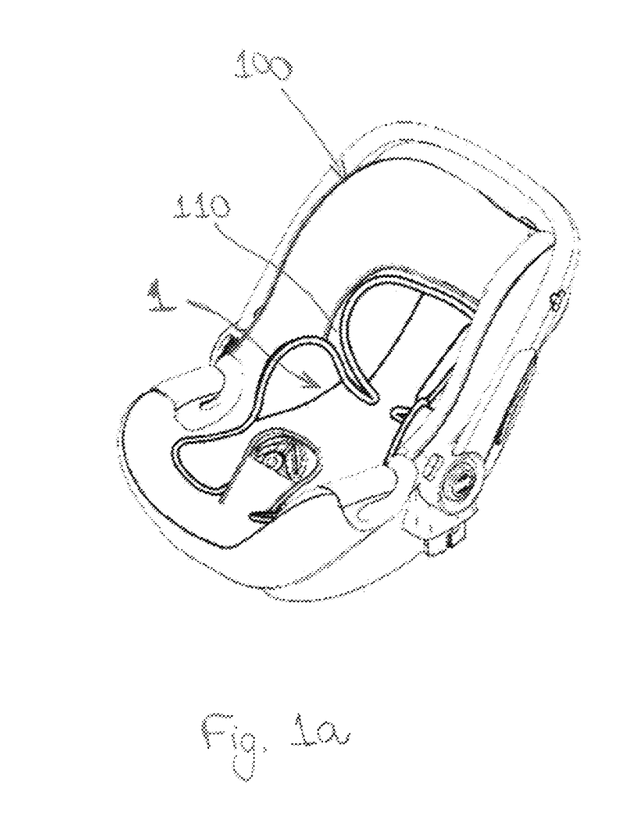
FIG. 1a: an oblique view of a baby car seat with the newborn insert in accordance with the invention.

FIG. 1a illustrates a baby car seat 100. It is equipped with a newborn insert 1 in accordance with the invention. The baby car seat 100 is a child safety seat in which the newborn insert 1 in accordance with the invention may be inserted. The newborn insert 1 is inserted in the lying region of the baby car seat 100. The lying region comprises a headrest 110 and a region for accommodating the child's back (not illustrated). The newborn insert 1 is used for infants from zero to approximately one year. It serves to protect infants due to their shortness additionally to the damping elements which are integrated in the baby car seat. For older children over approximately one year the head of the child is placed directly on the headrest 110. The child's back is placed in the corresponding part of the baby car seat. The illustrated newborn insert 1 is inserted loosely in the lying region of the baby car seat 100. It may thus be inserted easily in the baby car seat 100. It is likewise easy to remove the newborn insert 1 from the baby car seat 100.

Figure 1B:
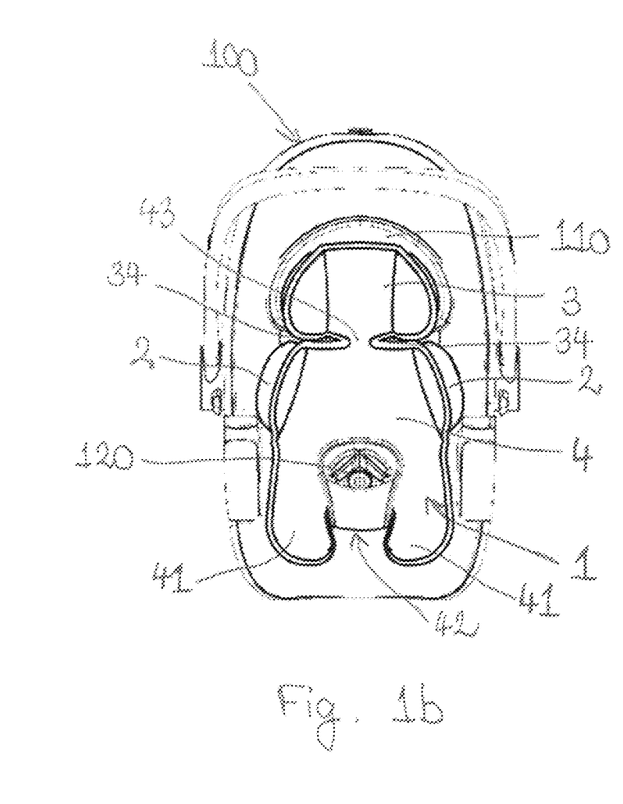
FIG. 1b: a plan view of the baby car seat with the newborn insert in accordance with the invention.

FIG. 1b illustrates the newborn insert 1 inserted in the baby car seat 100 of FIG. 1a in a plan view. The newborn insert 1 is placed in the lying region of the baby car seat 100. The newborn insert 1 comprises a head region 3. It serves to accommodate a child's head. The illustrated head region 3 is of three-part design. The exact design of the head region 3 will be described specifically in connection with FIGS. 2a and 2b. The newborn insert 1 comprises further a trunk region 4. It serves to accommodate at least a part of the child's body, especially the trunk and the thighs. The trunk region 4 comprises in the lower half, i.e. the half facing away from the head region 3, a recess 42. This recess 42 is provided to provide an outlet for the safety belt lock 120 of the baby car seat 100. In the lower half the trunk region 4 comprises two regions 41 as a support pad for the child's legs, especially the thighs. Laterally, two energy-transferring elements 2 are arranged at the trunk region 4. These energy-transferring elements 2 are arranged in the upper half of the trunk region 4, i.e. the half facing the head region 3. If a child is transported in the baby car seat 100, the energy-transferring elements 2 are positioned at the height of the shoulder region. As will be described with respect to FIGS. 4a and 4b, the energy-transferring elements 2 serve to transfer energy to the shoulder region of the child in the case of a side impact so as to introduce the energy in the child's body. As little energy as possible is introduced in the child's head region. This results in that the child's head region suffers as little damage as possible in the case of an impact.

The head region 3 and the trunk region 4 form an accommodation region for the child. As is illustrated in FIG. 1b, the head region 3 and the trunk region 4 are coupled or connected with one another via a small web 43. Slots 34 are illustrated at both sides of the web 43 between the head region 3 and the trunk region 4. These slots 34 constitute a clearance serving as an outlet for the shoulder belts of the baby car seat 100. At the same time the belts are guided through the slots 34. The slots 34 therefore also serve as a positioning aid. As will be explained specifically with respect to FIGS. 3a and 3b, the slots 34 facilitate a correct positioning of the newborn insert 1. In order for the newborn insert 1 to fulfil its protective function optimally it is namely necessary to position it such that, in the case of a side impact, the energy-transferring elements 2 transfer energy to the shoulder region of the child. Due to the slots 34 through which the shoulder belts may be guided, the position of the energy-transferring elements 2 of the newborn insert 1 is, when it is used in the baby car seat 100, coupled to the exit point for the shoulder belts (see in this respect the description of FIGS. 3a and 3b).

Figure 2A:
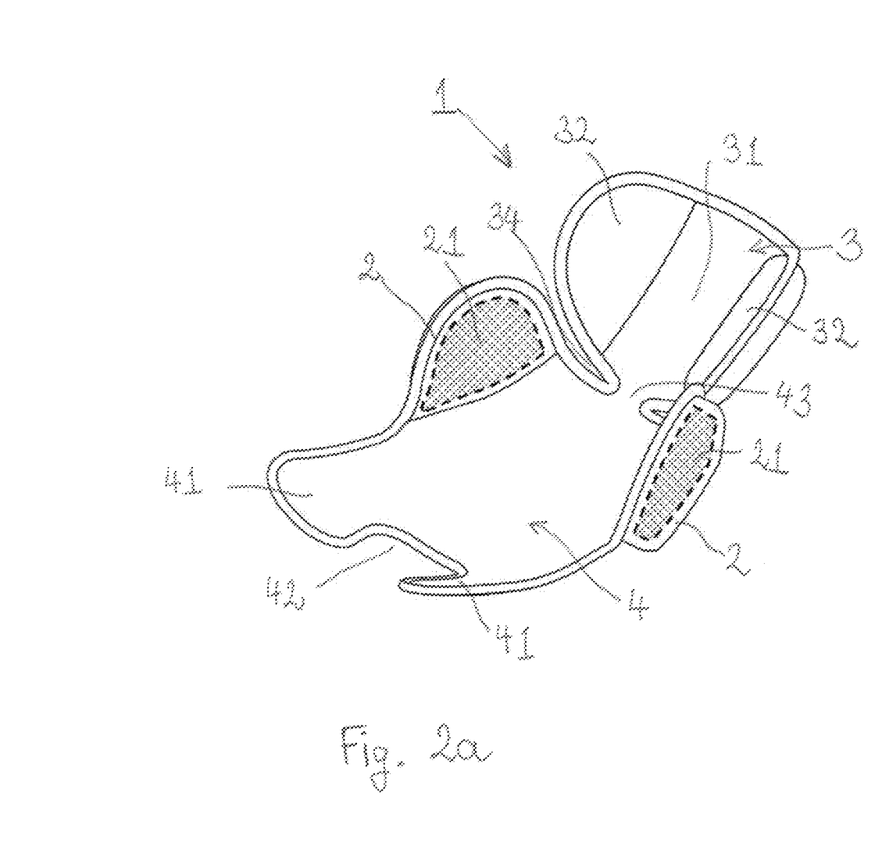
FIG. 2a: an oblique view of a newborn insert in accordance with the invention with inherently stable components.

FIG. 2a illustrates a newborn insert 1 in accordance with the invention as it may, for instance, be used in the baby car seat of FIGS. 1a and 1b. It comprises a head region 3, a trunk region 4, and two energy-transferring elements 2. The head region 3 and the trunk region 4 serve to accommodate a child. The head region 3 and the trunk region 4 may therefore each be conceived as parts of an accommodation region for a child of the newborn insert 1. Each of the energy-transferring elements 2 is arranged laterally at the trunk region 4.

The energy-transferring elements 2 are arranged in the upper half of the trunk region 4, i.e. the half facing the head region 3. The energy-transferring elements 2 are arranged at the trunk region 4 such that, if a child is placed correctly on the newborn insert 1, they are at the child's shoulder height. Each of the energy-transferring elements 2 comprises a component 21 of inherently stable material. In FIG. 2a each of the inherently stable components 21 is stored in a pocket of the energy-transferring element 2. Since the inherently stable components 21 are each positioned within a pocket, they are marked by a dashed line in FIG. 2a. The pocket may be designed as a part of the sheath of the newborn insert 1. The pocket protects the inherently stable component 21 from damage, dirt, and loss. As is illustrated in FIG. 2a, each energy-transferring element 2 projects outwardly laterally from the upper half of the trunk region 4. The energy-transferring elements 2 project like wings from the trunk region 4. Each of the inherently stable components 21 may be designed in the form of small blocks of inherently stable material. The thickness of the small blocks is expediently in the range of 15 mm to 30 mm, particularly preferred in the range of 20 mm to 25 mm. Expanded polystyrene, EPS, is preferably used as inherently stable material.

The trunk region 4 serves to accommodate the child's body. As described in connection with FIG. 1b, the trunk region 4 comprises a recess 42 and two regions 41 for placing the child's legs or thighs. The recess 42 serves, for instance, the outlet of the safety belt lock of the baby car seat.

The illustrated head region 3 is of three-part design. It comprises a middle segment 31 and two lateral segments 32. The middle segment 31 is the region in which the child's head is placed under normal conditions of use. The lateral segments 32 form lateral damping elements for the child's head. Both the middle segment 31 and the lateral segments 32 are deformable. The head region 3 is therefore also deformable. Preferably, the lateral segments 32 are padded. Thus, they increase the child's comfort, on the one hand. On the other hand, they stabilize the head with respect to lateral movements. The middle segment 31 comprises an insert of polyurethane foam. This will be described specifically in connection with FIG. 2b.

Furthermore, the web 43 between the head region 3 and the trunk region 4 is illustrated. The web 43 may also be conceived as a part of the accommodation region of the newborn insert 1. The web 43 enables good adaptation of the newborn insert 1 to the curved lying region of a baby car seat. Due to the narrow web 43 the newborn insert 1 clings to the baby car seat both in the back region and in the region of the headrest.

Moreover, the slots 34 are illustrated. As described in connection with FIG. 1b, they may serve as a positioning aid for the shoulder belts of a baby car seat. As an alternative to the slots 34 which are designed as recesses between the head region 3 and the trunk region 4, it is also possible to incorporate slots in the accommodation region of the newborn insert 1 at shoulder height, namely such that the head region 3 and the trunk region 4 are connected with one another at the external edges. This increases the stability of the newborn insert 1. It is, however, of disadvantage in this respect that the shoulder belts have to be threaded through the slots 34.

Figure 2B:
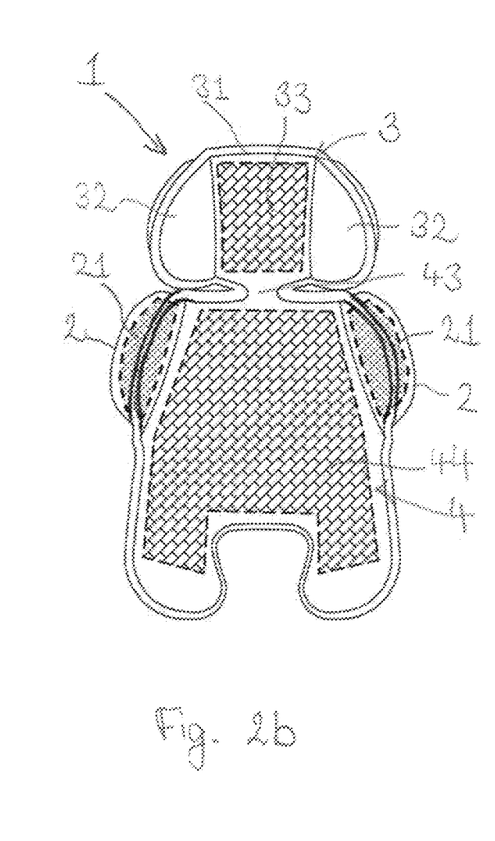
FIG. 2b: a plan view of a newborn insert in accordance with the invention with inherently stable components and inserts of polyurethane foam in the head and trunk regions.

FIG. 2b illustrates a newborn insert 1 as it is illustrated in FIG. 2a, additionally comprising a respective insert 33 and 44 in the head region 3 and in the trunk region. The inserts are accommodated in the sheath of the newborn insert 1. Therefore, the inserts 33 and 44 are illustrated with a dashed edging. Moreover, the energy-transferring elements 2 and their respective inherently stable components 21 are illustrated. They have already been described in connection with FIG. 2a.

The head region 3 is of three-part design. The two lateral segments 32 are preferably padded. The middle segment 31 of the head region 3 comprises an insert 33. The insert 33 consists preferably of polyurethane foam, particularly preferred of composite flock foam. The composite flock foam has expediently a density of 100 g/l. The insert 33 in the head region 3 has expediently a thickness between 10 mm and 40 mm, preferably between 20 mm and 30 mm, particularly preferred 20 mm.

The illustrated trunk region 4 comprises also an insert 44. The insert 44 consists preferably of polyurethane foam, particularly preferred of composite flock foam. The composite flock foam has expediently a density of 100 g/l. The insert 44 in the trunk region 4 has expediently a thickness between 5 mm and 20 mm, preferably between 10 mm and 15 mm, particularly preferred 10 mm.

It is expedient that the thickness of the insert 33 in the head region 3 is maximally twice as large as the thickness of the insert 44 in the trunk region 4. Such choice prevents that the transition between the head region and the trunk region, i.e. the web 43, comprises too large a step. This would make lying of the child uncomfortable.

It is also possible that the insert comprises a plurality of stacked layers of polyurethane foam to achieve the preferred thickness.

The insert 33 in the head region 3 cushions the bouncing back of the child's head in the case of a rear-end collision. The insert 44 in the trunk region 4 serves predominantly purposes of comfort. It is therefore also possible that no insert 44 is available in the trunk region 4.

The newborn inserts 1 illustrated in FIGS. 1a, 1b, 2a, and 2b comprise preferably a sheath. It is preferred that this sheath is designed to hold the further parts of the newborn insert 1 in position. These parts include the energy-transferring elements 2, the inherently stable components 21, the insert 33 of the head region 3, the insert of the lateral segments 32 of the head region 3 and/or the insert 44 of the trunk region 4. The mentioned pocket of the energy-transferring element 2 for accommodating the inherently stable component 21 may be designed as a part of the sheath. The sheath is preferably of one-part design. Expediently, the sheath comprises one or more openings through which one or a plurality of the afore-listed parts may be removed and may be returned. The sheath is preferably made of tissue. The tissue may comprise a foam lining.

The newborn inserts 1, as illustrated in FIGS. 1a, 1b, 2a, and 2b, are of one-part design. The head region 3 and the trunk region 4 are fixedly connected with one another. In accordance with the invention it is, however, also possible that the newborn insert is of multi-part design. In this case it is further possible that the head region and the trunk region are designed as components which are separable from each other. The energy-transferring element is arranged laterally at the trunk region. A separable connection between the head region and the trunk region may be established by a connecting means. A hook and loop fastener, a zip fastener, or a snap fastener serve, for instance, as connecting means. In the above-described multi-part design of the newborn insert it is further expedient if each separate component comprises an appropriate sheath.

Figure 3A:
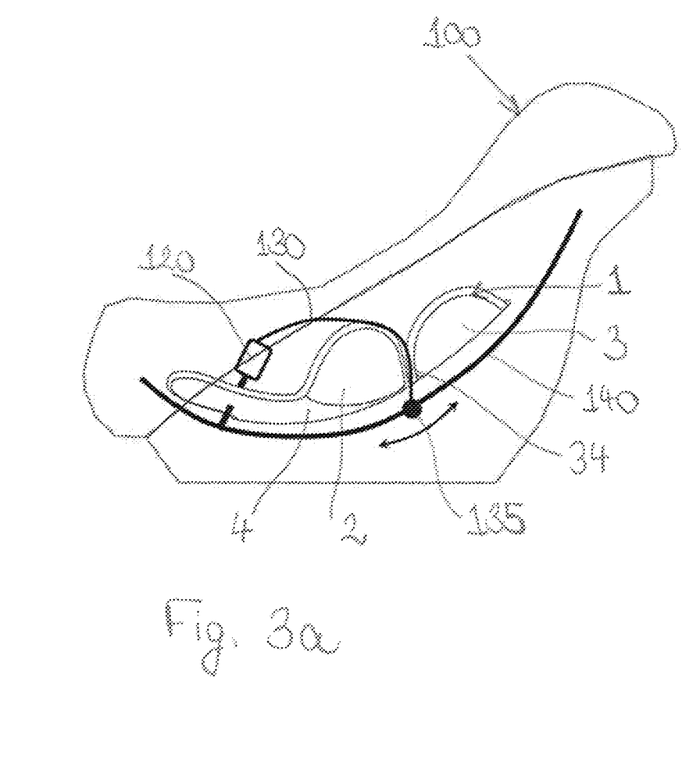
FIGS. 3a and 3b: the use of the newborn insert in accordance with the invention with an adjustable belt system in a baby car seat.
Figure 3B:
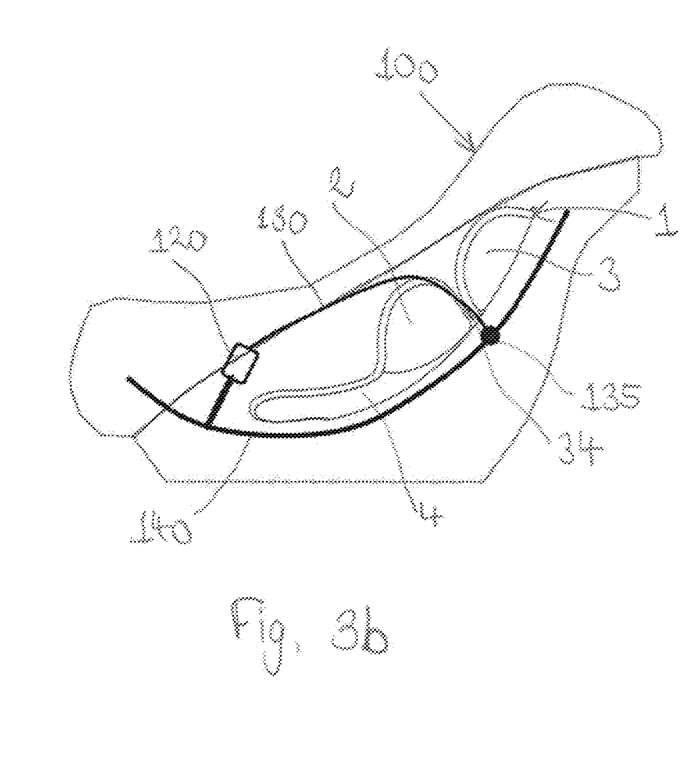

In FIGS. 3a and 3b it is shown how one of the afore-described newborn inserts 1 for children of different age is brought in the right position in a baby car seat 100. In FIGS. 3a and 3b the contours of the baby car seat 100 are illustrated with dots. Any of the afore-described newborn inserts is possible as a newborn insert 1. In FIG. 3a the newborn insert 1 is in a low lying position. This one is suited, for instance, for newborns of few months. Furthermore, a shoulder belt 130 of the baby car seat 100 is illustrated. It is guided from the belt exit point 135 through a slot 34 of the newborn insert 1. The shoulder belt 130 is anchored in the safety belt lock 120 of the baby car seat 100. The shoulder belt 130 is passed through the head region 3 and the trunk region 4 of the newborn insert 1. The belt exit point 135 is adjustable, as is indicated by the double arrow in FIG. 3a. The belt exit point 135 may be displaced along the lying region 140 of the baby car seat 100. The belt exit point 135 is adjusted such that the shoulder belt 130 can be guided optimally over a child's shoulder. This means that the belt exit point 135 is always readjusted as a function of the child's age. It is always at the child's shoulder height. Due to the fact that the energy-transferring element 2 of the newborn insert 1 is arranged at the upper half of the trunk region and the slots 34 which serve as a guide of the shoulder belt 130 are recessed between the trunk region 4 and the head region 3 of the newborn insert 1, the newborn insert 1 is held in a position by the shoulder belt 130, so that the energy-transferring element 2 is positioned in the child's shoulder region.

FIG. 3b differs from FIG. 3a only in that the newborn insert 1 is illustrated in an upright lying position. The belt exit point 135 is displaced farther away from the safety belt lock 120. This takes the larger body height of the child, especially the larger torso, into account. If the belt exit point 135 for the shoulder belt is displaced farther away from the safety belt lock 120, the newborn insert 1 moves automatically along therewith in the same direction. This is because the shoulder belt 130 is guided through a slot 34 of the newborn insert 1. If the belt exit point 135 and hence the shoulder belt 130 is displaced, the shoulder belt 130 guides the newborn insert 1 along. The adjusting of the shoulder belt 130 thus causes an adjusting of the newborn insert 1. In other words, the newborn insert 1 adapts itself to the child. Due to the fact that the newborn insert 1 is guided along with the belt exit point 135 and/or with the shoulder belt 130, the energy-transferring element 2 is positioned at the child's shoulder height.

Figure 4A:
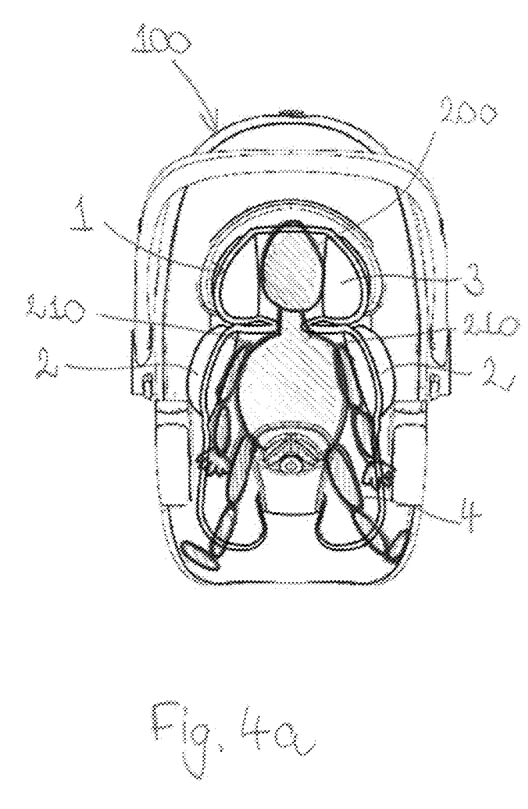
FIG. 4a: a child in a baby car seat with the newborn insert in accordance with the invention under normal conditions.
Figure 4B:
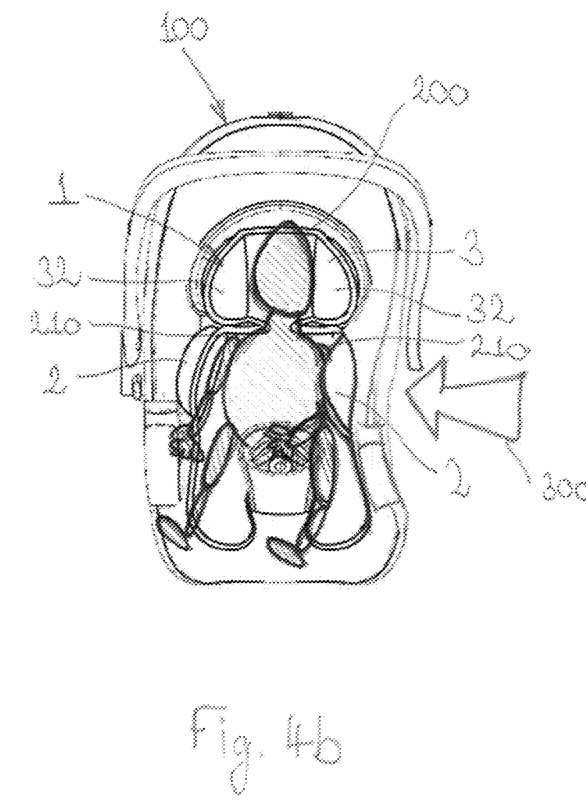
FIG. 4b: the effect of the newborn insert in accordance with the invention on a child in the case of a side impact.

In FIG. 4a the use of the newborn insert 1 in accordance with the invention is shown under normal conditions. In FIG. 4b the effect of the newborn insert 1 is illustrated in the case of a side impact, indicated by the arrow 300. FIGS. 4a and 4b are to clarify especially why the positioning of the energy-transferring elements 2 of the newborn insert 1 in the shoulder region 210 of a child 200 increases the protection of the child.

FIG. 4a illustrates a child 200 lying in a baby car seat 100. Additionally, a newborn insert 1 in accordance with the invention is used. The child 200 lies thereon. The head of the child 200 is placed on the head region 3, the trunk and the thighs are placed in the trunk region 4. The illustrated configuration corresponds to a typical use of the baby car seat 100 with a newborn insert 1 under normal conditions in a vehicle. The shoulder belts and the lap belts with which the child is secured are not shown for reasons of clearness. The energy-transferring elements 2 are each placed in the shoulder region 210 of the child 200.

FIG. 4b illustrates the change of baby car seat 100, newborn insert 1, and position of the child 200 in the case of a laterally acting force (illustrated by the arrow 300). The laterally acting force 300 occurs, for instance, in the case of a side impact. The laterally acting force 300 first of all accelerates the baby car seat 100. A deformation of the baby car seat 100 comes along with this. Part of the energy of the impact is dampened by the baby car seat 100 itself and by the damping elements incorporated therein. A remaining part of the energy is transferred to the interior of the baby car seat 100 and accelerates the baby car seat 100. Due to the inertia of the child 200 the child is pushed to the side of the baby car seat 100 which is subject to the impact. In FIG. 4b the newborn insert 1 is positioned such that the energy-transferring element 2 is arranged in the shoulder region 210 of the child 200. During the impact the energy-transferring element 2 therefore encounters first of all a shoulder region 210 (here the left one) of the child 200. Due to the fact that the energy-transferring element 2 comprises an inherently stable component, a large part of the remaining energy of the impact is transferred to the shoulder region 210 and then introduced via this region into the body of the child 200. The body absorbs a large part of the energy mentioned. Moreover, the energy-transferring element 2 displaces the shoulder region 210 of the child 200 in the case of a side impact and hence also the body of the child 200. Thus, part of the energy is transformed into kinetic energy.

Due to the energy-transferring element 2 with an inherently stable component a large part of the energy of an impact which is not absorbed by the baby car seat 100 is transferred to the body of the child 200. The head remains largely unaffected, as is indicated in FIG. 4b. This is due to the fact that the energy-transferring elements 2 transfer the forces of the impact mainly via the shoulder region to the body. Due to the fact that the shoulder of the child 200 is displaced in this process, the head of the child escapes an impact. By the energy-transferring elements 2 the shoulder of the child 200 is pushed in a controlled manner in the direction of force 300, so that free space is provided for the head of the child 200.

The deformable, preferably padded, lateral segments 32 of the head region 3 have a damping and spring effect. They therefore protect the head of the child 200 during a slight impact.

In FIGS. 1 to 4 the use of a newborn insert in accordance with the invention was described in a baby car seat. In accordance with the invention the newborn insert is, however, not restricted to the use in baby car seats, but it may correspondingly also be used in different child safety seats, especially in different backward retaining systems, for the transport of newborns and infants.

LIST OF REFERENCE NUMBERS 1 newborn insert
2 energy-transferring element
21 inherently stable component of the energy-transferring element 2
3 head region of the newborn insert 1
31 middle segment of the head region 3
32 lateral segment of the head region 3
33 insert of the head region 3
34 slots/positioning aid of the newborn insert 1
4 trunk region of the newborn insert 1
41 region of the trunk region 4 for accommodating a child's thighs
42 recess of the trunk region 4
43 web between the head region 3 and the trunk region 4
44 insert of the trunk region 4
100 baby car seat
110 headrest of the baby car seat 100
120 safety belt lock of the baby car seat 100
130 shoulder belt of the baby car seat 100
135 adjustable belt exit point
140 lying region of the baby car seat 100
200 child
210 shoulder region of the child 200
300 arrow for indicating a laterally acting force

The invention claimed is:
1. A newborn insert for a child safety seat, comprising an accommodation region for a child, the accommodation region comprising a head region configured to accommodate a head of the child and a trunk region config- ured to accommodate a portion of a body of the child, wherein the head region is comprised of a first material, and an energy-transferring element comprising an inherently stable component and configured to direct energy away from a head of the child toward a shoulder region of the child in response to a lateral force acting on the child safety seat, wherein the energy-transferring element is coupled to an upper half of the trunk region, the upper half of the trunk region adjacent the head region, such that the energy-transferring element is positioned at a shoulder height of the child when the child is placed in the accommodation region, wherein the inherently stable component is comprised of a second material, the second material being different from the first material of the head region, and wherein the head region and the trunk region are coupled with one another such that a belt of the child safety seat can be passed between the head region and the trunk region, the belt thereby maintaining the energy-transferring element at a particular position when the belt is positioned between the head region and the trunk region, and wherein a position of the belt on the child safety seat is adjustable between a plurality of positions such that the particular position of the energy-transferring element is at the shoulder height of the child based on a size of the child when the child is placed in the accommodation region.

2. The newborn insert according to claim 1, wherein the second material of the inherently stable component consists of expanded polystyrene, EPS.

3. The newborn insert according to claim 1, wherein the head region and the trunk region are coupled with one another such that a slot is formed between the head region and the trunk region as a positioning aid for the belt, the slot being fully enclosed by the head region and the trunk region.

4. The newborn insert according to claim 1, wherein the head region and the trunk region each comprise an insert of a foam material.

5. The newborn insert according to claim 4, wherein the foam material comprises polyurethane foam.

6. The newborn insert according to claim 1, further comprising a second energy-transferring element with a corresponding inherently stable component, wherein the second energy-transferring element is coupled to an upper half of the trunk region facing the head region of the child such that the second energy-transferring element is positioned at the shoulder height of the child when the child is placed in the accommodation region, wherein the energy-transferring element is coupled to a first side of the trunk region and the second energy-transferring element is coupled to a second side of the trunk region, the first side being opposite from the second side.

7. A baby car seat comprising the newborn insert according to claim 1.

8. The newborn insert according to claim 1, wherein the energy transferring element comprises a plurality of pockets, wherein each pocket of the plurality of pockets consists of an inherently stable material configured to direct energy away from the head of the child toward the shoulder region of the child in response to the lateral force acting on the child safety seat.

9. The newborn insert according to claim 8, wherein the inherently stable material is expanded polystyrene.

10. The newborn insert according to claim 9, wherein the inherently stable material in each pocket has a thickness between 15 mm to 30 mm.

11. The newborn insert according to claim 8, wherein each of the trunk region and the head region comprise a foam insert configured to increase the comfort of the child.

12. The newborn insert according to claim 11, wherein the foam insert of the head region has a thickness between 10 mm to 40 mm, and wherein the foam insert of the trunk region has a thickness between 5 mm to 20 mm.

13. The newborn insert according to claim 11, wherein the head region comprises a middle segment having a first side and a second side opposite from the first side and a first lateral segment extending laterally from the first side and a second lateral segment extending laterally from the second side, wherein the middle segment comprises the foam insert, and wherein the first lateral segment and the second lateral segment comprise a dampening element configured to protect the head of the child.

14. The newborn insert according to claim 1, wherein the inherently stable component of the energy-transferring element is resilient, relative to the head region, to direct energy toward the shoulder region of the child and away from the head of the child, in response to the lateral force acting on the child safety seat, and the head region is deformable, relative to the inherently stable component, such that the head region dampens an impact of the head in the head region due to the lateral force.

15. The newborn insert according to claim 14, wherein the first material of the head region comprises a polyurethane foam and the second material of the inherently stable component comprises a coarse-poured foam.

16. The newborn insert according to claim 14, wherein the first material of the head region comprises a polyurethane foam and the second material of the inherently stable component comprises an expanded polystyrene.

17. A child safety seat comprising:
a belt to secure a child to the child safety seat, the belt attached to the child safety seat at a first end of the belt and configured at a second end of the belt to anchor into a lock, wherein a location of the first end of the belt is adjustable between a plurality of locations; and
an insert including:
an accommodation region for the child, the accommodation region comprising a head region configured to accommodate a head of the child and a trunk region configured to accommodate a portion of a body of the child, wherein the head region is comprised of a first material, and wherein the head region and the trunk region are coupled with one another such that the belt can be passed between the head region and the trunk region, the belt thereby maintaining the insert at a particular position when the belt is positioned between the head region and the trunk region; and
an energy-transferring element comprising an inherently stable component and configured to direct energy away from a head of the child toward a shoulder region of the child in response to a lateral force acting on the child safety seat,
wherein the energy-transferring element is coupled to an upper half of the trunk region, the upper half of the trunk region being adjacent the head region, and wherein the particular position at which the belt maintains the insert is such that the energy-transferring element is positioned at a shoulder height of the child based on a size of the child when the child is placed in the accommodation region,
wherein the inherently stable component is comprised of a second material, the second material being different from the first material of the head region.

18. The newborn insert according to claim 17, wherein the location of the first end of the belt is adjustable along a lying region of the child safety seat.

\* \* \* \* \*